United States Patent

[11] 3,595,010

[72] Inventor Val Kaiser
3413 West Wells St., Milwaukee, Wis. 53208
[21] Appl No 814,591
[22] Filed Apr. 9, 1969
[45] Patented July 27, 1971

[54] ENCLOSED INDICATING DEVICE
5 Claims, 4 Drawing Figs.
[52] U.S. Cl. 58/126, 58/45, 116/136 5
[51] Int. Cl. G04b19/00, G04b 45/04
[50] Field of Search 58, 126, 126 D, 127, 43, 152 F, 45, 2

[56] References Cited
UNITED STATES PATENTS
2,886,942 5/1959 Stucky. 58/126
2,915,874 12/1959 Ferguson, Jr. 58/126
3,465,512 9/1969 Usui et al. 58/45 X Primary Examiner—Richard B. Wilkinson
Assistant Examiner—Stanley A. Wal
Attorney—Andrus, Sceales, Starke and Sawall ABSTRACT: A clock including second, minute and hour arms terminated at the ends in magnets. The clock is enclosed in a housing having the outer face formed of plastic to transmit magnetic flux. Corresponding small minute, hour and second hands of a magnetic material slidably abut the exterior surface of the plastic and are aligned with the appropriate outer ends of the internal hour, minute and second arms. The hands are magnetically coupled and slide over the outer face to indicate the time.

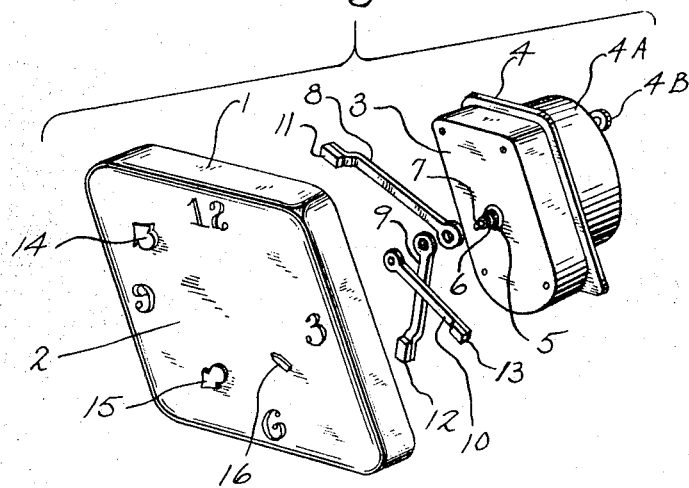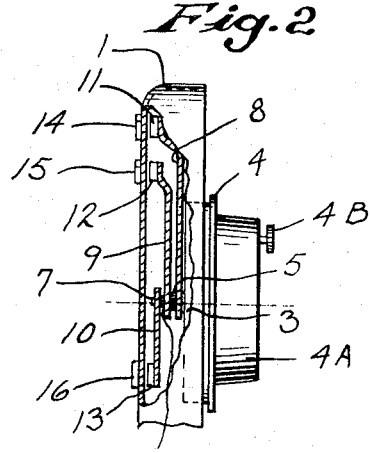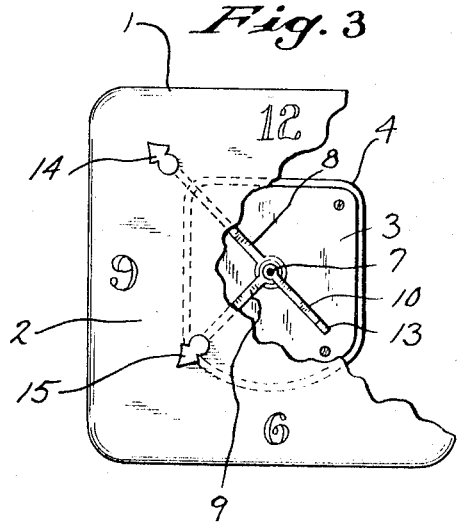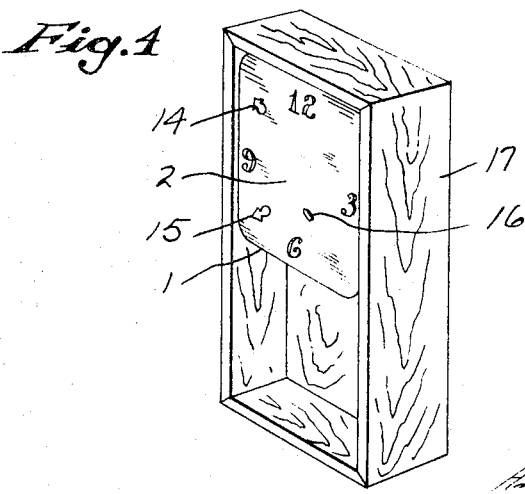
INVENTOR
VAL KAISER
ATTORNEYS 3,595,010

ENCLOSED INDICATING DEVICE

BACKGROUND OF THE INVENTION

This invention relates to an enclosed indicating device having external indicating means.

In the gauge and indicating art, a visual readout is normally provided for indicating the particular condition or function being recorded. In many applications, it may be desirable to employ a total enclosure in which case a transparent readout or the like is provided or in the alternative an external readout indicator is coupled through a sealed opening to the drive mechanism. Although such indicators provide satisfactory controls or devices in many applications there might be other applications where it would be desirable to eliminate the transparent readout window and/or the external coupled indicators. For example, time clocks which are mounted within the wall of a home or the like could desirably be constructed with totally hidden elements with only suitable external indicators or readout elements directly coupled to or mounted on the external wall.

SUMMARY OF THE INVENTION

The present invention is particularly directed to a clock, gauge or other suitable condition and/or function indicator wherein the visual-indicating elements are not physically interconnected to the drive mechanism and thus may provide a very convenient means for adapting the readout devices to a totally enclosed unit for either functional and/or esthetic considerations. Generally, in accordance with the present invention, the drive mechanism is formed in the conventional manner to respond to a given condition and/or function. The drive mechanism furthermore drives and positions an indicator in accordance with the conventional construction. The total assembly is enclosed with a wall portion coextensive with the movement of the internal indicator of a nonmagnetic and magnetic flux-transmitting material. The internal indicator and an external indicator are formed with magnetic coupling members at least one of which constitutes a source of magnetic flux. As a result, the external indicator will be correspondingly positioned on the nonmagnetic surface to provide a direct visual readout of the internal mechanism. The invention has been particularly applied to an enclosed or hidden clock assembly. In the construction, the clock arms were terminated in magnetic members. The total assembly was then enclosed with the outer face formed of a suitable magnetic flux-transmitting material such as a plastic having a relatively smooth outer surface. Corresponding minute, hour and second hands were provided of magnetic coupling material slidably abutting the exterior surface of the plastic and aligned with the appropriate outer end of the internal hour, minute and second arms. Applicant has found that a construction provides a reliable readout of the time. Furthermore, the indicators can be selected arbitrarily to correspond to a decor or the like. Furthermore, they can be periodically changed in accordance with the season and/or desired decorative effect.

The drawing furnished herewith illustrates the best mode presently contemplated by the inventor for carrying out the present invention and clearly discloses the above advantages and features as well as others which will be readily understood from the description of the illustrated embodiment.

BRIEF DESCRIPTION OF DRAWING

In the drawing:

FIG. 1 is an exploded view of a clock mechanism constructed in accordance with the present invention;

FIG. 2 is a fragmentary side elevational view with parts broken away in section to more clearly illustrate the present invention;

FIG. 3 is a front elevational view with parts broken away in section to further illustrate details of construction; and FIG. 4 is a pictorial view showing the clock mechanism of FIGS. 1—3 housed within a decorative mounting assembly.

DESCRIPTION OF PREFERRED EMBODIMENT

Referring to the drawings, and particularly to FIG. 1, the illustrated embodiment of the invention is a clock, including a housing 1 having a front face 2 formed of a suitable plastic, or other magnetic flux-transmitting material. A clock mechanism 3 is secured to a wall of the housing 1 and in particular, includes a mounting wall 4 otherwise suitably secured thereto. The clock mechanism includes the usual gear drive interconnected to be driven from a time clock motor 4a having a setting element 4b. Time-indicating drive elements project through an opening in the backwall of housing 1 into the housing. Generally, they include an hour hub 5 in the form of a tubular member, within which a minute hub 6 is rotatably disposed and projects forwardly therefrom. A second shaft 7, in turn, is rotatably extended through the hub 6 and projects forwardly, terminating immediately adjacent the front wall 2 of the housing 1. The several hubs 5 and 6 and the shaft 7 are coupled to the gear mechanism within the clock mechanism 3 in accordance with well known constructions.

An arm 8 is provided with an inner hub which is press fitted or otherwise secured to the driven hub 5. The arm 8 therefore rotates in accordance with well known constructions to provide an indication of the hour.

A minute arm 9 is similarly secured to the rotating driven hub 6. Finally, a second arm 10 is similarly secured to the outer extended end of shaft 7. This, of course, provides a more or less conventional clock mechanism with the hands hidden by the housing 1.

In accordance with the illustrated embodiment of the present invention, the outer ends of the arms 8 and 9 are bent outwardly to locate the arms generally in the plane of the second arm 10 with the arms 8 and 9 being longer than arm 10 and arm 8 longer than arm 9, to stagger the outer ends and permit rotation relative to each other without the ends interfering with each other. In accordance with the present invention, the arm 8 terminates in the outwardly bent end defining a surface parallel to and spaced inwardly from the forward wall 2 of housing 1, A magnet 11 is secured as by a suitable adhesive to the outermost end of the arm 8.

An external indicator 14 formed of a magnetic material is slidably abutted against the wall 2 and located in alignment with the magnet 11. The rotation of the arm 8 and the attached magnet 11 is thus transmitted to the member 14 through the magnetic flux established by the magnet 11. As a result, the indicator 14 moves in a circle on the face of the wall 2. As noted in FIGS. 1, 3 and 4, the front wall 2 is provided with the time indicia such that the location of indicator 14 provides a direct indication of the hour.

A magnet 12 is similarly secured to the outwardly bent end of arm 9. A similar minute indicator 15 is disposed abutting the wall 2 for corresponding positioning.

A third magnet 13 is secured to the outer arm 10 and drives an indicator 16 slidably disposed abutting the wall 2.

The different lengths of arms 8, 9 and 10 permit unrestricted sliding movement of the several indicators 14, 15 and 16 over the outer face, without the necessity of any special guide grooves or the like, to provide the desired time indication.

In the illustrated embodiment of the invention, the minute indicator 15 and the hour indicator 14 are shown as pointed members. The second indicator 16 is shown as a small rectangular block for purposes of distinguishing at any given instant. The second had indicator 16 will, of course, be moving at a much more rapid rate generally similar to the movement of a sweep second hand in the conventional clock.

In the illustrated embodiment of the invention, the innermost hour arm 8 extends outwardly beyond the minute arm 9. As a result, the hour indicator 14 is located generally outwardly of the minute indicator 15. It will be recognized that this is a reverse positioning with respect to the more conventional lengths of the minute and hour arms. If desired, this can be readily changed by attaching an extension, not shown, to the face of the minute indicator 15 such that it projects outwardly beyond the indicator 14. In such a construction, the length of the internal arms 8, 9 and 10 would be reduced with respect to the size of the face 2 to permit the proper placement of the indicating elements and their extensions. Alternatively, a clock mechanism may be constructed to alter the placement of the hubs 5 and 6 to permit the desired direct location of the operating magnets.

In any event, the clock assembly can be housed within any suitable enclosure, for example, as shown within a decorative frame 17 in FIG. 4. The internal clock assembly may, of course, be incorporated within a wall structure with the outer wall, which will permit the transmission of the magnetic flux and formed of any relatively smooth surface to permit sliding movement of external indicators. Fox example, in a panelled room, by employing a relatively thin veneer wall, the clock may be completely hidden behind a wall with the indicating elements secured to the face of the wall for rotation through the magnetic coupling.

The releasable flux clamping of the indicating elements to the enclosure face permits convenient changing of the elements for purposes of decoration. Thus, for example, during the Easter season, the pointed element may be replaced with Easter eggs, Easter bunnies or the like. Similarly, during the Christmas season, Santa Clauses or other presentations associated with the Christmas season may be employed. Obviously, the color, character, size and the like of the indicators may be changed to match a given decor and may be subsequently modified in the event of a change in the decorations.

In addition to the clock construction, the present invention might be employed in any other suitable indicating or gauge device wherein it is desired to enclose the drive mechanism, including an indicator, while providing a visual indication of the position of the hidden indicator. For example, it might be applied to gauges and indicators for speed, heat, pressure or any other mechanical movement or condition which is subject to be converted into a movement. For example, indicating dials on electronic equipment, such as television, radios and the like, might be provided with an indicating unit having the enclosed drive mechanism and the indicator releasably attached to the front face of a dial. Similarly, a speedometer, thermostat, oil pressure meter in a vehicle might be provided with a similar form of indicating mechanism. Thus, although the present invention is illustrated and described in connection with a particularly novel clock structure, particularly from the standpoint of matching a decor, the invention may be employed to any other similar application.

I claim:

1. A time-indicating device having an enclosing housing, comprising a movable indicating means movably mounted within said housing and positioned in accordance with a physical function, a clock mechanism connected to drive said movable indicating means, said housing having a magnetic flux-transmitting wall portion coextensive with the positioning of the indicating means, an outer indicating means disposed adjacent said wall portion for selective movement with the indicating means within said housing, cooperating magnetic means on said indicating means, at least one of said magnetic means establishing a magnetic flux which is transmitted through the adjacent wall portion to the other of said magnetic means to couple the elements for corresponding with respect with respect to the movable indicating means and thereby provides a visual indication of the position of such movable indicating means and the time, said magnetic means forming the sole support for said outer indicating means and establishing holding forces to maintain said outer indicating means in position with said wall portion disposed in a vertical plane.

2. The time-indicating device of claim 1, said indicating means each including an hour element, and a minute element and a second element, and having cooperating magnetic means secured to the corresponding elements.

3. The time-indicating device of claim 1, wherein said magnetic means includes a permanent magnet connected to the one indicating means and a magnetic element connected to the other indicating means.

4. The time-indicating device of claim 1, wherein the movable indicating means includes a rotatable arm aligned with said wall portion, said magnetic means being secured to the outer end of the arm, said outer indicating means including a small indicator element of a magnetic material.

5. The time-indicating device of claim 1, wherein said movable indicating means includes an hour arm, a minute arm and a second arm, each of said arms being of a different length and coupled to a common rotating axis, said magnetic means including permanent magnets secured to the outer ends of the respective arms, and said outer indicating means being formed of magnetic blocks of preselected configuration and being directly magnetically coupled to the corresponding permanent magnet.

UNITED STATES PATENT OFFICE
CERTIFICATE OF CORRECTION

Patent No. 3,595,010            Dated July 27, 1971

Inventor(s) VAL KAISER

It is certified that error appears in the above-identified patent and that said Letters Patent are hereby corrected as shown below:

Column 2, Line 65, before "indicator" cancel "had" and insert --- hand ---;

Column 4, Line 16, after "corresponding" insert --- relationship ---;
    (Claim 1)

Column 4, Line 17, cancel "with respect" at the beginning of the line.
    (Claim 1)

Signed and sealed this 29th day of February 1972.

(SEAL)
Attest:

EDWARD M. FLETCHER, JR.          ROBERT GOTTSCHALK
Attesting Officer                     Commissioner of Patents

FORM PO-1050 (10-69)